March 20, 1962     C. F. M. BAKER     3,025,531
CIRCULAR BED PAN
Filed March 14, 1960
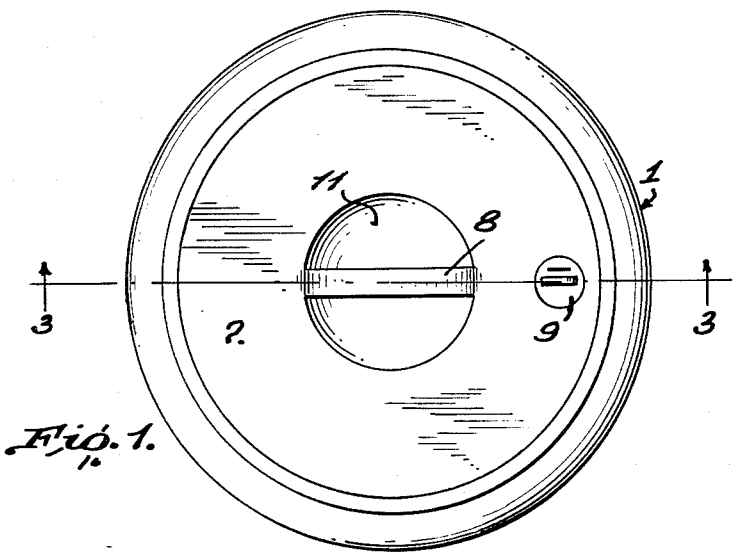
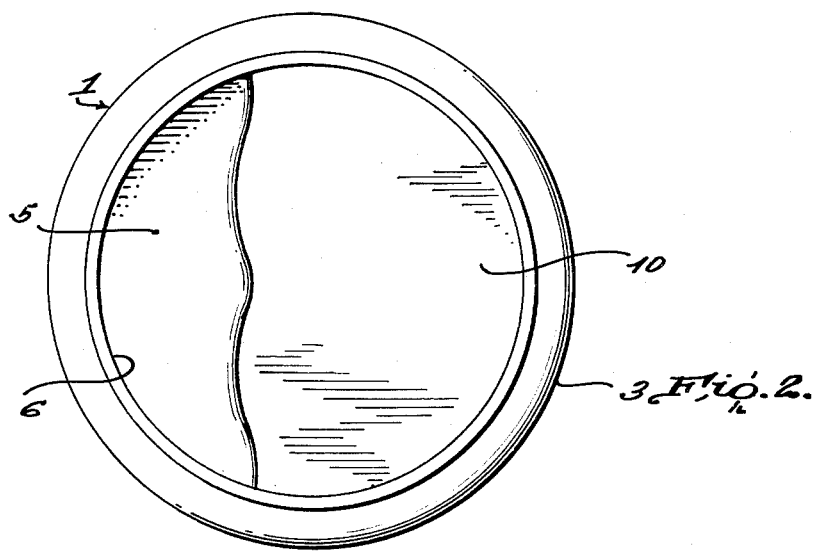
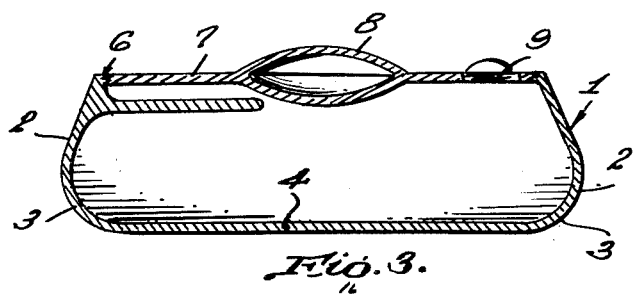
INVENTOR
Carolyn F.M. Baker 3,025,531
CIRCULAR BED PAN
Carolyn F. M. Baker, 214 Hill Country Lane,
Hill Country Estates, San Antonio, Tex.
Filed Mar. 14, 1960, Ser. No. 14,883
1 Claim. (Cl. 4—112)

This invention relates to providing a comfortable means of releasing human refuse while in a lying-down position.

It is an object of the present invention to provide a means of sanitary disposal in a simple and efficient manner which will be less likely to spread contagious disease germs due to a screw-top lid. Specimens for laboratory tests can be obtained with less effort and more safety, due to a needle-injector opening with cap-lid.

The object of the present invention is to provide a new and improved design in bed pans. Many various types of bed pans have been commercially available. Those that are in general use are quite bulky, they are difficult to handle and clean and are not ordinarily provided with sanitary means for covering the contents after use. It is surprising that the bed pans normally available have not been provided with some sort of suitable cover.

Another object is to provide a bed pan of a size that can be conveniently handled.

A still further object is to provide a bed pan of a material that can be kept sanitary at all times and, in particular, is provided with a suitable and convenient cover that allows the contents to be sealed after use and to also keep the bed pan proper, clean and sanitary when not in use. The cover with its attached handle permits easy carrying of the bed pan without danger of spilling or tilting as is common practice in the handling of standard bed pans.

Briefly stated, this invention comprises a bed pan that is circular in shape, instead of the usual elongated shape of standard bed pans. Being circular in shape, it allows for a screw on cover that permits sealing of the pan before and after use. The cover has a "peep hole" opening which allows an attendant to look into the pan when desired, this eliminating the necessity of removing the cover to determine if the pan has been used. A partial seat or support for supporting the buttocks of the user is integral with the wall of the pan to allow comfortable resting on the pan when it is being used. The cover is provided with an integral handle that allows for easy removal or placing of the cover in place and carrying of the pan from place to place. Preferably the bed pan of this invention can be made of a hard plastic that may be immersed in hot water for sterilizing purposes. However, other materials may be employed.

Referring to the drawings,

FIGURE 1 is a plan view of the bed pan with the cover in place.

FIGURE 2 is a plan view of the bed pan with the cover removed.

FIGURE 3 is a sectional view on line 3—3 of FIG. 1.

In detail the bed pan 1 is circular in shape and preferably is of a plastic material that can be immersed in boiling water for sterilization purposes. The side walls 2 of the circular pan taper outwardly and downwardly and are rounded, as at 3 to connect with the broad, flat bottom 4. Thus, the upper end of the bed pan is somewhat smaller in diameter than the base. Formed integral with the pan is a shaped seat or extension 5 for supporting the buttocks of the user. The upper face of the pan is threaded, as at 6, to receive a threaded cover that is also circular. This cover 7 is provided with a handle 8 for turning and for handling the bed pan and carrying it from place to place. The cover is also provided with a small "peep hole" 9 so that an attendant may peek into the pan. This opening 9 may be threaded and likewise be closed with a small cap 11, thus permitting the pan to be perfectly sealed before and after use. Likewise, when sealed, the pan when filled may be conveniently carried or moved from place to place without danger of spilling of the contents.

The many advantages of this circular bed pan should be recognized as a definite improvement over any previous vessel used for the same purposes.

While this invention has been described with particular reference to the construction shown in the drawing and while various changes may be made in the detail construction, it shall be understood that such changes shall be within the spirit and scope of the present invention as defined by the appended claim.

Having thus completely and fully described the invention, what is now claimed as new and desired to be protected by Letters Patent of the United States is:

A bed pan comprising a circular bottom, a continuous inwardly curved side wall integrally joined with and extending upwardly from said circular bottom, said side wall being threaded about the inside of its upper periphery; a seat integrally, perimetrically disposed with respect to said side wall and extending inwardly therefrom, said seat being spaced below said upper periphery and substantially parallel with said circular bottom; a flat peripherally threaded circular cover adapted to cooperate with the upper peripheral threads of said side wall to form a water-tight seal therewith, said cover having an eccentrically located threaded hole formed therein; and a flat circular threaded plug adapted to removeably seal said hole whereby samples may be taken of the contents of said bed pan without removing said cover.

References Cited in the file of this patent
UNITED STATES PATENTS

| | | |
|---|---|---|
| 819,582 | Newton | May 1, 1906 |
| 1,060,106 | Mailette et al. | Apr. 29, 1913 |
| 2,087,286 | Hicks | July 20, 1937 |
| 2,187,283 | Scheutz | Jan. 16, 1940 |
| 2,582,586 | Dorr | Jan. 15, 1952 |
| 2,604,636 | Nielsen | July 29, 1952 |
| 2,686,557 | Karlsson et al. | Aug. 17, 1954 |
| 2,779,949 | Crispen | Feb. 5, 1957 |